UNITED STATES PATENT OFFICE.

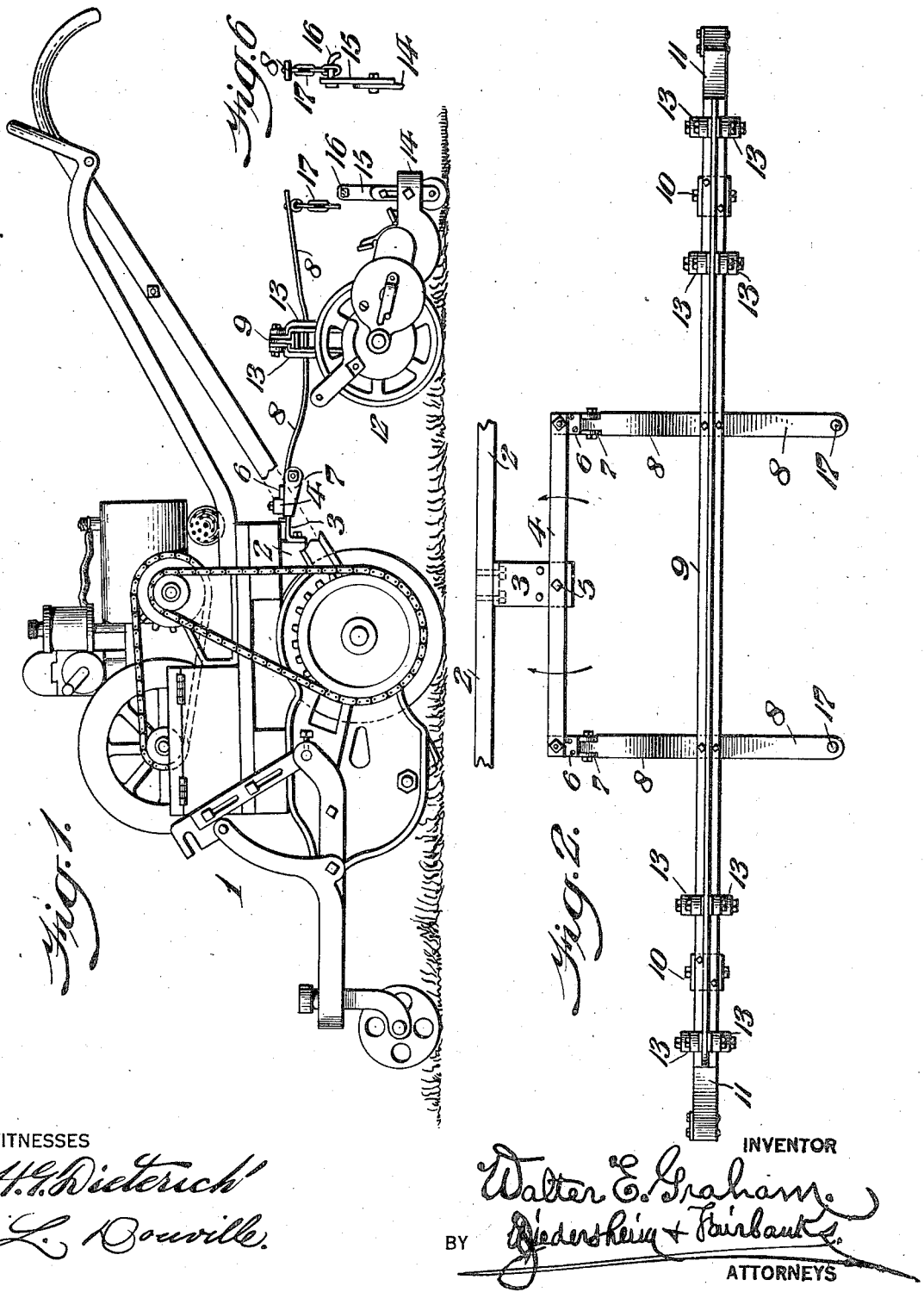

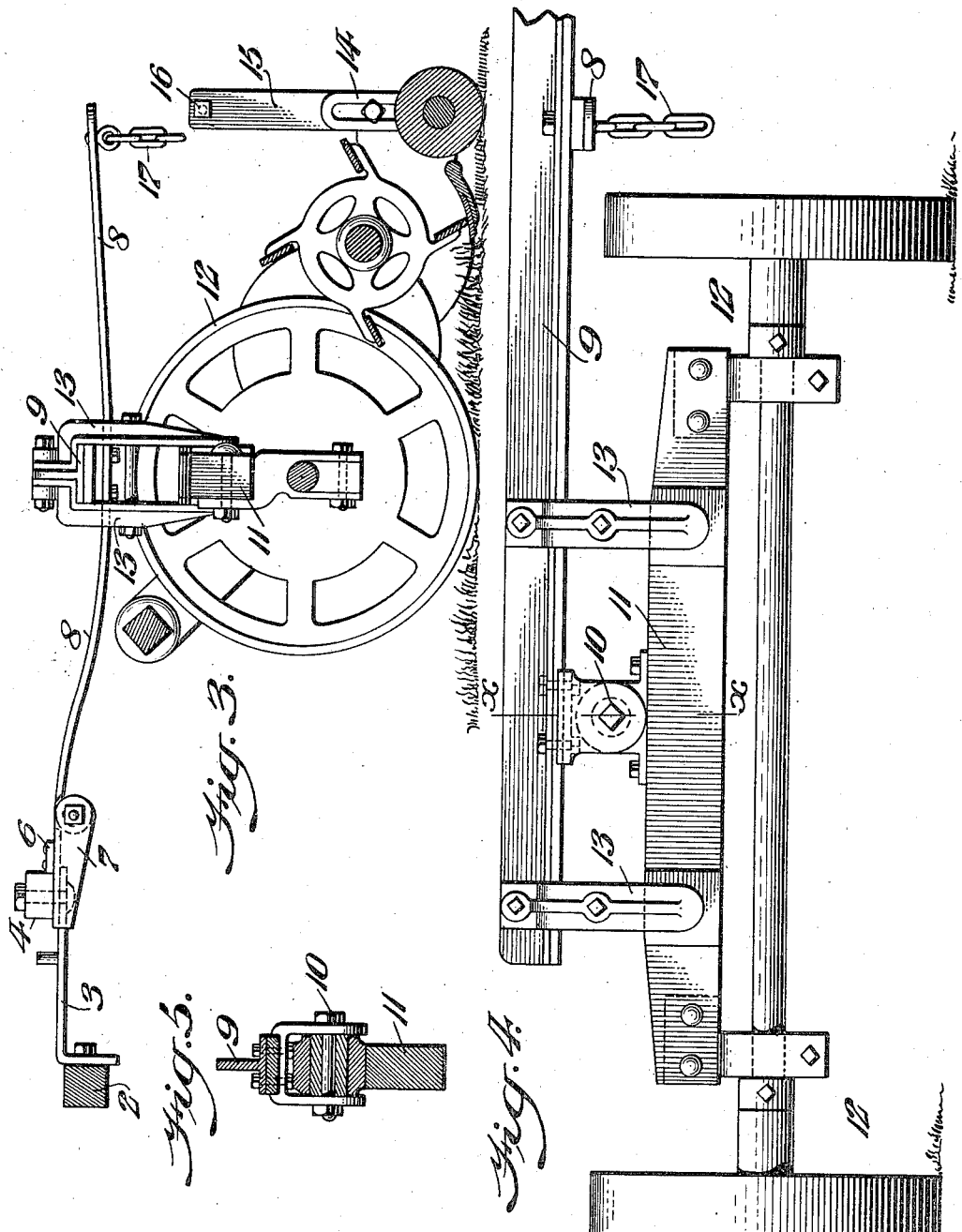

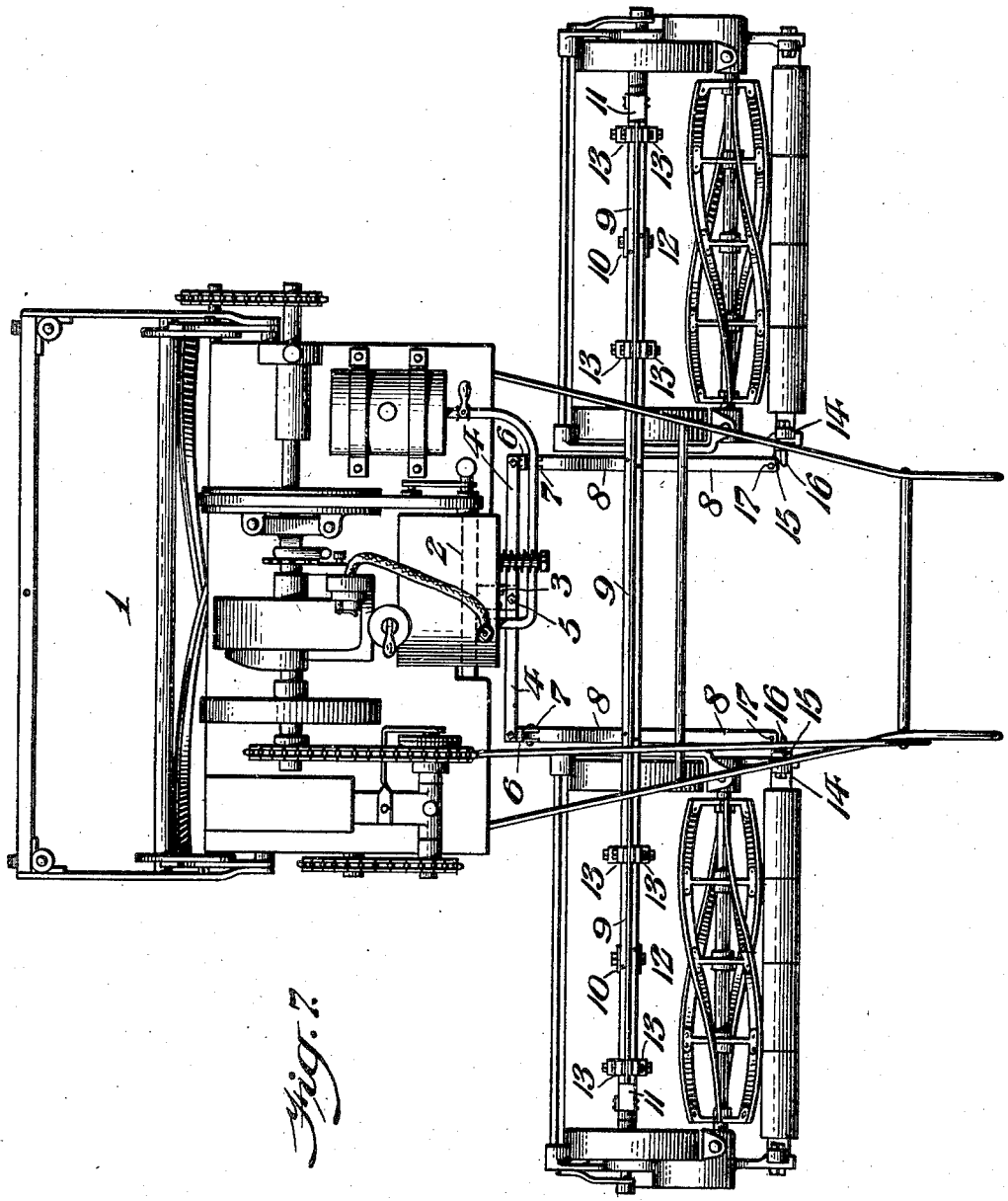

WALTER E. GRAHAM, OF PHILADELPHIA, PENNSYLVANIA.

LAWN-MOWER.

1,226,206.			Specification of Letters Patent.		Patented May 15, 1917.

Application filed December 18, 1915. Serial No. 67,531.

*To all whom it may concern:*

Be it known that I, WALTER E. GRAHAM, a citizen of the United States, residing in the city and county of Philadelphia, State of Pennsylvania, have invented a new and useful Lawn-Mower, of which the following is a specification.

My invention consists of a motor lawn mower having trailing lawn mowers or trailers connected therewith, and projected respectively to the right or left thereof, so as to mow grass in a plurality of swaths, thus correspondingly increasing the width of mowing, while the power of the lawn mower proper is communicated to said trailers to cause the latter to follow the former, without requiring separate power or draft for each trailer.

The invention is satisfactorily illustrated in the accompanying drawing, but the important instrumentalities thereof may be varied, as long as they are included in the scope of the claims.

Figure 1 represents a side elevation of a lawn mower embodying my invention.

Fig. 2 represents a top or plan view of a portion thereof.

Fig. 3 represents a partial vertical section, and a partial side elevation of a detached portion on an enlarged scale.

Fig. 4 represents a rear view of a portion shown in Fig. 3.

Fig. 5 represents a section of a portion on line x—x Fig. 4.

Fig. 6 represents a side elevation of a detached portion of one of the trailers.

Fig. 7 represents a top or plan view of the device.

Similar numerals of reference indicate corresponding parts in the figures.

Referring to the drawings.

1 designates what is known as a motor lawn mower. 2 designates a cross beam on the rear of the frame of said mower, the said cross beam having bolted or otherwise firmly secured to it, the bracket 3, the latter extending horizontally rearward from said beam.

Mounted on said bracket is the lever 4 which is pivotally connected therewith by the bolt 5 which is passed vertically through the center of said lever into the adjacent portion of said bracket, whereby said lever is adapted to oscillate in horizontal directions, or to the right and left.

Connected with the ends of said beam 4 are the rearwardly extending leaves 6. 8 are reaches or arms, the forward ends of which are connected by knuckles or knuckle joints 7 to said leaves, said reaches or arms extending rearwardly and having firmly connected therewith intermediate of their ends the transversely extending beam 9. This beam 9 has connected therewith near each end, by means of a horizontal pivotal joint 10, a beam 11. Each beam 11 constitutes a part of a trailing lawn mower 12 which may hereinafter be denominated as a "trailer," it being evident that there is one of such trailers on each end portion of the beam 9, the two trailers being spaced to the right and left of the motor lawn mower 1 and to the rear thereof.

Connected with the beam 9 and depending therefrom on each end portion of the same are the saddles 13 which freely embrace the respective beams 11 of the trailers, it being seen that the latter may oscillate in vertical direction on either of the axes 10 due to inequalities of the ground over which said trailers may run independent of each other. Then both trailers may oscillate in vertical direction or rise and lower together owing to the knuckle or knuckle joints 7 of the arms 8 on the beam 4, and the beam 9 and said arms 8 form a frame which may oscillate or turn in horizontal direction on said beam 4, due to the vertical bolt 5 which forms the axis of said beam 4 on the bracket 3, and thus the trailers may oscillate forward or backward according to the nature of the ground over which they run, it being evident that the motions of the trailers over the ground are comparatively universal, being both up and down separately, or in unison.

It is evident that said trailers will cut swaths of grass to the right and left of the swath cut by the power lawn mower, consequently there will be a multiplied extent of cutting of the grass, the corresponding increase of the work at comparatively one time being appreciable.

Should it be desired to raise the cutters of the trailers from the ground (or one trailer independent of each other) there are secured to the rear portion of the frame 14 of the trailers, the standards 15 from which project laterally the pins 16. Depending from the rear ends of the arms 8 are the chains 17, either of whose links may be fitted on the pins 16, when the rear portion of the frame 15 is raised, whereby the cutters of the trailers are raised and removed from the grass, thus avoiding mowing of the same.

It is to be noticed that the power-lawn mower is the master motor, and so becomes a power motor of each trailer, the said power lawn mower embodying mechanism that creates both the prime power for the propulsion positively of said power lawn mower and the operation positively of the cutter thereof.

These two features are self-contained as one in said power lawn mower, and the draft of the latter is communicated positively to each trailer, so as to propel the same, and operate the cutters thereof, and so there is a combination of several mowers which are positively driven from the advance mower, in the manner above stated.

Having thus described my invention what I claim as new and desire to secure by Letters Patent, is:—

1. A lawn mower composed of a power lawn mower positively driven, trailer lawn mowers arranged in transverse alinement with each other and connected with the former and adapted to be drawn by the same, and independent oscillatory mountings for said trailer lawn mowers whereby the latter are adapted for independent vertical oscillatory movements.

2. In a lawn mower, a motor lawn mower, trailer lawn mowers arranged in transverse alinement with each other and an independently supported frame for the latter extending from the former and mounted on vertical and horizontal pivots for independent oscillatory movement whereby said trailer lawn mowers are adapted to turn to the right and left and to rise and fall.

3. A main lawn mower, trailer lawn mowers arranged in transverse alinement with each other, rearwardly extending reaches indirectly supporting the trailer lawn mowers and independent frames for said trailer mowers supported from said reaches.

4. A main lawn mower, trailer lawn mowers arranged in transverse alinement with each other, rearwardly extending reaches supporting indirectly the trailer lawn mowers and independent frames for said trailer mowers supported indirectly from said reaches, and mounted thereon for oscillatory movements.

5. A power lawn mower, a lever connected with the frame thereof to turn to the right and left, arms connected with said lever by horizontal pivots whereby said arms may be oscillated vertically, a beam connected with said arms, and trailer lawn mowers carried by said beam to the right and left rearward of said power lawn mower.

6. A power lawn mower, a frame extending rearwardly therefrom, said frame being mounted for vertical oscillation, trailer lawn mowers having their frames connected with said frame, and coöperating means on said frame and the frames of the trailer lawn mowers adapted to hold the latter in elevated position.

7. A power lawn mower, a pivoted lever connected with the frame thereof to turn to the right and left, arms connected with said lever, means whereby said arms are adapted to be oscillated vertically, a beam connected with said arms, and trailer lawn mowers carried by said beam to the right and left rearward of said power lawn mower, the trailer lawn mowers having their frames pivotally connected independent of each other with said beam.

WALTER E. GRAHAM.

Witnesses:
F. J. Enos,
G. W. Baillord.